No. 624,940. Patented May 16, 1899.
F. W. HUESTIS.
RUBBER TIRED WHEEL.
(Application filed Nov. 9, 1898.)
(No Model.)
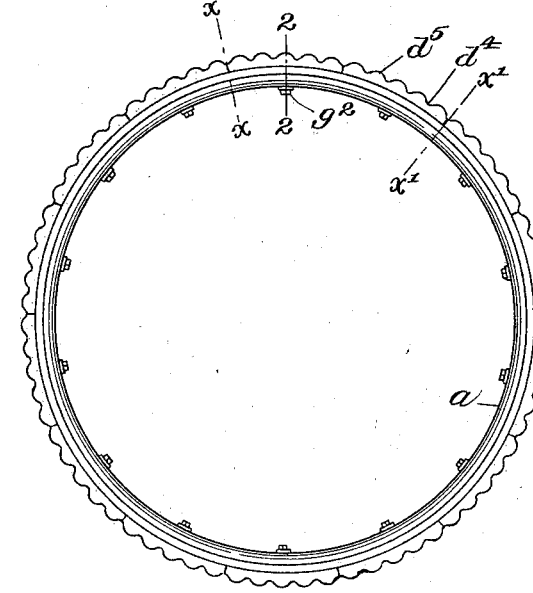
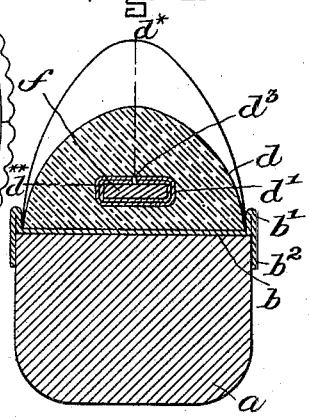
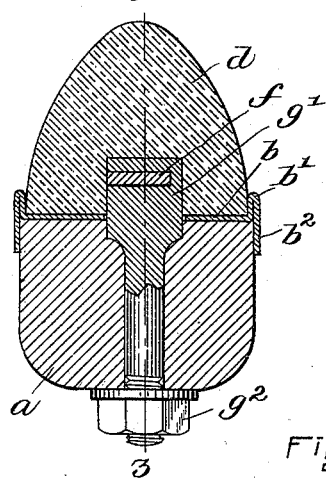
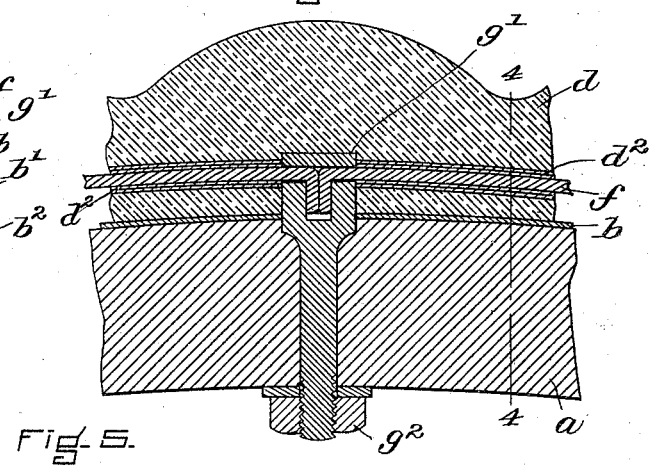
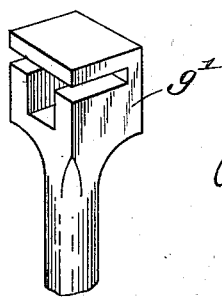
WITNESSES
A. D. Grover.
Fred E. Dorr.
INVENTOR
Frederick W. Huestis
by his attorney,
Edward S. Beach

UNITED STATES PATENT OFFICE.

FREDERICK W. HUESTIS, OF BOSTON, MASSACHUSETTS.

RUBBER-TIRED WHEEL.

SPECIFICATION forming part of Letters Patent No. 624,940, dated May 16, 1899.

Application filed November 9, 1898. Serial No. 695,927. (No model.)

*To all whom it may concern:*

Be it known that I, FREDERICK W. HUESTIS, of Boston, in the county of Suffolk and State of Massachusetts, have invented an Improvement in Rubber-Tire Construction for Vehicle-Wheels, of which the following is a specification, reference being had to the accompanying drawings, in which—

Figure 1 is a side view of a vehicle-wheel embodying my invention. Fig. 2 is a cross-section on line 2 2 of Fig. 1. Fig. 3 is a section on line 3 3 of Fig. 2. Fig. 4 is a section on line 4 4 of Fig. 3. Fig. 5 is a detail showing bolt.

The object of my invention is to produce a strong and comparatively cheap rubber-tire construction for vehicle-wheels, both old and new, my new construction permitting the ready removal of worn tires and portions thereof and the substitution therefor of new tires or portions thereof, as hereinafter explained; and my invention relates to the new combination and to the novel elements thereof hereinafter described.

In the drawings illustrating the principle of my invention and the best mode now known to me of applying that principle, $a$ is the felly of the wheel. The tire-holder, which is new with me and a feature of my invention, is rolled from suitable sheet metal to form the bottom $b$, sides $b'$, and felly-embracing flanges $b^2$. The flanges $b^2$ are inwardly and backwardly bent extensions of the sides $b'$, and they extend inwardly past the bottom $b$, so as to overlap the side margins of the felly, which fits snugly between the flanges, with the outer periphery of the felly lying against the inner periphery of the tire-holder. This tire-holder is readily and economically made, and the double thickness at the sides, where the flanges $b^2$ are opposed to the side portions $b'$, gives it proper strength and rigidity at the base of the rubber tire $d$. The tire is filled in the tire-holder, with the side margins of its base overlapped by the sides of the tire-holder. To secure an improved wearing-surface of the tire, I shape the tire on a mold or former of lesser diameter than the diameter of the wheel which is to receive the tire, the tire being stretched to position on the fellies or tire-holder. The effect of stretching the tire or tire-sections of lesser inner curvature than the curve of the felly is to compress the molecules of rubber at the tread-surface of the tire or tire-section, so as to make the same very largely self-healing in case of cut and so as to give greater density, and therefore greater durability, to the tread-surface than would otherwise be the case.

The tire may be of any suitable elastic material, and whether of the "interrupted" or continuous type is formed with a laterally-broad and vertically-narrow lengthwise-extending chamber $d'$, which is best lined with duck $d^2$, except on the upper side of the chamber at $d^3$, where the lining is interrupted in order to secure maximum resiliency in the direction of the dotted line $d^*$. If the lining were continuous, the tire would be practically inelastic on the outer side of the line $d^{**}$—that is, on the outer side of the retaining-band $f$. By interrupting the lining the elasticity of the tire is preserved from the apex of the outer periphery inwardly to the outer surface of the retaining-band. The broader sides of the chamber $d'$ are concentric with the felly and extend across the tire in its lower part from near one side of the tire to near the other side thereof, so that when the retaining-band $f$ is in the chamber the base-surface of the tire is firmly clamped against the outer periphery of the wheel. This retaining-band $f$ is usually of sheet metal and is of a cross-sectional size and shape to make a sliding fit in the chamber $d'$. Preferably I employ the interrupted tires—that is, tires which are made up of a considerable number of elastic tread surfaces or projections arranged around the wheel. By mounting a suitable number of such blocks or tire-forming sections on the retaining-band $f$ (whether the blocks be separated or be projections from a continuous base, as hereinafter explained) and forcing them between the sides of the tire-holder I readily secure the tire in place, clamping the retaining-strip in position by means of suitable fasteners which pass through the retaining-strip and fellies between opposed ends of the tire-forming blocks or sections. The ends of the retaining-strip may be confined in any suitable manner, as by the locking-bolt $g'$, which grips the free ends of the strip and is itself retained in the felly by the nut $g^2$. When this preferred form of locking device is used, the free ends of the retaining-strip are bent angularly and inwardly, as shown in Fig. 3. The locking-bolt $g'$ is then thrust from the inner side of the felly through the hole therein and the coincident aperture in the bottom of the tire-holder, so as to bring its outer end opposite the opposed edges of the bent ends of the retaining-strip. On the inner side of the inner end of the locking-bolt there is a T-shaped recess, the vertical portion of the recess being wide enough to receive both the inwardly-bent ends of the retaining-strip, while the horizontal portions of the recess receive the edges of the unbent parts of the contiguous portions of the strip. The free end portions of the retaining-strip being thus caught in the outer end of the locking-bolt, the latter is drawn inwardly and the opposed ends of the tire or tire-sections forced home. By setting up the nut $g^2$ the retaining-strip and tire or tire-sections are securely locked in place, the edges of the inwardly-bent portions of the strips being contained between the walls of the recess in the locking-bolt on one side and the opposite side of the aperture in the retaining-band and coincident wall of the hole through the felly on the other hand. A continuous tire may of course be used in lieu of the interrupted tire, if so desired.

If a section of the tire be worn or gouged out and needs to be replaced, the substitution is readily accomplished by loosening the fasteners and removing the objectionable section of tire.

In practice I commonly clamp the retaining-strip to the felly or fellies about once in eighteen inches, the fasteners extending radially of the wheel and drawing the under surface of the retaining-strip toward the outer peripheral surface of the wheel when they are tightened up, and so clamping the portion of the tire between the inner wall of the chamber and the outer surface of the wheel tightly in place and squeezing it out laterally, so that it is also pressed firmly against the sides of the tire-holder. If desired, the tire-holder may be applied to old wheels without removing the worn metal tires thereof.

The features of my invention as above explained may be embodied in vehicle-tire constructions of different kinds; but in practice I prefer to embody them in connection with my new wave-line tire, which is a very important feature of my invention. Heretofore interrupted tires have been made either of a series of tire-forming blocks or of continuous material formed with rectangular recesses at intervals along its outer periphery, the tread-forming projections having vertical end walls. Such tires have been held in place by retaining-bands having angular holes through which the tread-sections projected.

It has been found in practice that the spaces between the vertical end walls of the tread-forming blocks were liable to become filled with mud or choked with stones and that the angular end walls threw mud and dirt when in use. To overcome these objections, I have formed my new tire in its preferred form of continuous material and formed the recesses $d^4$ and intermediate tread-forming projections $d^5$ (see Fig. 1) by giving the exterior periphery a wave-line configuration. Of course the same wave-line configuration may be employed in connection with tire-forming sections, as indicated by the dotted lines $x\,x$ and $x'\,x'$. The curvature of the periphery of the tire may be varied, the pith of this feature of my invention consisting in the curvature of the end walls of the tread projections, whereby clogging and mud-throwing are obviated.

What I claim is—

1. The combination of a wheel having a rim with an elastic tire; a retaining-strip; and a locking-bolt; the free ends of the strip being bent inwardly and engaged by the walls of a slot in the locking-bolt.

2. The combination of a wheel having a rim with an elastic tire, said elastic tire being made up of a series of elastic tire-sections, the outer periphery of which sections is formed with alternating elevations and depressions; a retaining-strip; and a locking-bolt; the free ends of the strip being bent inwardly and engaged by the walls of a slot in the locking-bolt.

3. The combination of a wheel having a rim with an elastic tire, said elastic tire being made up of a series of elastic tire-sections, the outer periphery of which sections is formed with alternating elevations and depressions; a tire-holder; a retaining-strip; and a locking-bolt; the free ends of the strip being bent inwardly and engaged by the walls of a slot in the locking-bolt.

4. The combination of a wheel having a rim with an elastic tire, said elastic tire being made up of a series of longitudinally-chambered elastic tire-sections, the outer periphery of which sections is formed with alternating elevations and depressions; a lining for said chamber; a retaining-strip which passes through said chamber; and a locking-bolt, the free ends of the strip being bent inwardly and engaged by the walls of a slot in the locking-bolt.

In testimony whereof I have signed my name to this specification, in the presence of two subscribing witnesses, on this 1st day of November, A. D. 1898.

FREDERICK W. HUESTIS.

Witnesses:
R. P. ELLIOTT,
JAMES HAMILTON.